United States Patent [19]

Chu et al.

[11] Patent Number: 5,053,442

[45] Date of Patent: Oct. 1, 1991

[54] LOW MODULUS SILICONE SEALANTS

[75] Inventors: Hsien-Kun Chu, Wethersfield, Conn.; Russell P. Kamis; Loren D. Lower, both of Midland, Mich.

[73] Assignee: Dow Corning Corporation, Midland, Mich.

[21] Appl. No.: 465,702

[22] Filed: Jan. 16, 1990

[51] Int. Cl.$^5$ ................................................ C08K 9/06
[52] U.S. Cl. ...................................... 523/212; 524/425; 524/788
[58] Field of Search ................. 523/212; 524/425, 788

[56] References Cited

U.S. PATENT DOCUMENTS

| | | | |
|---|---|---|---|
| 3,856,839 | 12/1974 | Smith et al. | 260/429.5 |
| 4,143,088 | 3/1979 | Favre et al. | 260/825 |
| 4,687,829 | 8/1987 | Chaffee et al. | 528/17 |
| 4,711,928 | 12/1987 | Lee et al. | 524/860 |

*Primary Examiner*—Melvyn I. Marquis
*Attorney, Agent, or Firm*—Edward C. Elliott

[57] ABSTRACT

A process for producing a silicone sealant, which is stable in the absence of moisture, cures when exposed to moisture, has an elongation at break of greater than 800 percent, and has adhesion to concrete. The silicon sealant is produced by first mixing an alkoxysilethylene endblocked polymer, a dialkyldialkoxysilane, and a titanium catalyst, then mixing in precipitated calcium carbonate filler having a fatty acid surface treatment.

16 Claims, No Drawings

LOW MODULUS SILICONE SEALANTS

BACKGROUND OF THE INVENTION

Field of the Invention

This invention relates to improved neutral curing silicone sealants which cure upon exposure to moisture at room temperature, having low modulus and adhesion to concrete.

Background Information

Silicone sealants which cure through a neutral reaction are known in the art. Examples can be found in U.S. Pat. No. 3,856,839, issued Dec. 24, 1974, disclosing alkanedioxy titanium chelates which catalyze the cure of a composition which also contains methyltrimethoxysilane and a silanol chain-stopped polydiorganosiloxane fluid; and U.S. Pat. No. 4,143,088, issued Mar. 6, 1985, disclosing use of alkoxylated organosilicon compounds consisting of either monomers or polymers having difunctional, trifunctional, or tetrafunctional molecules, comprising at most 40 percent of difunctional monomers in an organosilicon composition which is storage stable in the absence of moisture and is rapidly curable into elastomers with self-adherent properties in the presence of water at room temperature.

The sealants such as described in these references have a tendency to require a longer time to cure as they shelf age. In some cases, the sealant arrives at a point where it no longer cures upon exposure to moisture. This is particularly serious, because the user does not realize the problem until after the sealant is put into place. To correct the problem, all of the uncured sealant must be removed and replaced, a very time consuming and expensive undertaking.

A method of improving the storage stability is shown in U.S. Pat. No. 4,687,829, issued Aug. 18, 1987. An improved sealant is produced by mixing alkoxy functional polydiorganosiloxane having alkoxysilethylene ends with a combination of trifunctional or tetrafunctional silane crosslinker and difunctional silane chain extender. A method of producing such a sealant having an in situ treated filler is taught in U.S. Pat. No. 4,711,928, issued Dec. 8, 1987.

Neutral curing sealants having reinforcing silica fillers have been produced which have a low modulus, but their adhesion to concrete has been marginal. A need exists for a low cost, neutral sealant having a low modulus and good adhesion to concrete for use as a sealant for highways.

SUMMARY OF THE INVENTION

The method of this invention prepares a sealant by mixing in the absence of moisture an alkoxysilethylene endblocked polydiorganosiloxane, difunctional alkoxysilane, and titanium catalyst, then admixing an extending filler.

DESCRIPTION OF THE INVENTION

This invention relates to a process of producing silicone sealants containing polydiorganosiloxane having alkoxy endblocking, alkoxy functional chain extender, and titanium catalyst, wherein the improvement comprises a method consisting essentially of (A) first mixing in the absence of moisture (1) 100 parts by weight of a polymer mixture of the average formula

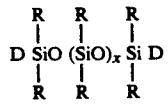

where each R is free of aliphatic unsaturation and is selected from the group consisting of monovalent hydrocarbon, monovalent halohydrocarbon, and monovalent cyanoalkyl radicals of 1 to 18 inclusive carbon atoms, each D is selected from the group consisting of vinyl radical and radicals of the formula

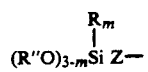

where each R'' is selected from the group consisting of methyl, ethyl, propyl, and butyl, Z is a divalent hydrocarbon radical or a combination of divalent hydrocarbon radicals and siloxane radicals, m is 0 or 1, and x is of a value such that the polymer has a viscosity of from 0.5 to 3000 Pa.s at 25° C., less than 40 percent of the total of the endblocking radicals D in the polymer mixture being vinyl radicals, (2) from 0.1 to 14 parts by weight of a dialkoxysilane of the formula $R'_2Si(OR'')_2$ where each R' is selected from the group consisting of methyl and vinyl, R'' is as defined above, and (3) from 0.2 to 6.0 parts by weight of titanium catalyst, and then (B) adding after the above are mixed, (4) from 10 to 200 parts by weight of precipitated calcium carbonate filler, having a fatty acid surface treatment and a surface area of greater than 20 m²/g, then (C) storing the mixture in the absence of moisture, to give a sealant which is stable in the absence of moisture, has an elongation at break of greater than 800, and has adhesion to concrete.

The method of this invention uses polymer of the formula

where each R is free of aliphatic unsaturation and is of the group monovalent hydrocarbon, monovalent halohydrocarbon, and monovalent cyanoalkyl radicals of 1 to 18 inclusive carbon atoms, each D is selected from the group consisting of the vinyl radical and radicals of the formula

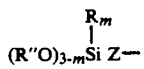

where each R'' is selected from the group consisting of methyl, ethyl, propyl, and butyl, Z is a divalent hydrocarbon radical or combination of divalent hydrocarbon radicals and siloxane radicals, m is 0 or 1, and x is of a value such that the polymer has a viscosity of from 0.5 to 3000 Pa.s at 25° C., less than 40 percent of the total of endblocking radicals D in the polymer mixture being vinyl radicals. R can be any of those monovalent hydrocarbon, monovalent halohydrocarbon, or monovalent cyanoalkyl radicals of 1 to 18 inclusive carbon atoms which are known to be useful in silicone sealant materials. The preferred radicals are methyl, ethyl, propyl, phenyl, and trifluoropropyl. Z is a divalent hydrocarbon radical or combination of divalent hydrocarbon radicals and siloxane radicals. The divalent hydrocarbon radical can be from 2 to 15 carbon atoms in the form of a divalent alkylene or arylene radical such as ethylene, propylene, hexylene, phenylene, and

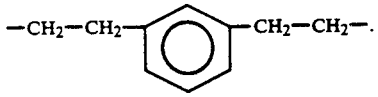

A preferred Z may be represented by the formula

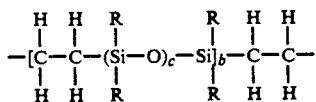

where R is as defined above, b is 0 or 1, and c is from 1 to 6.

The polymer of (1) can be produced by reacting a vinyl endblocked polydiorganosiloxane of the formula

   I where each R is as defined above, Vi is vinyl radical, and x is as defined above with as endcapping composition of the formula

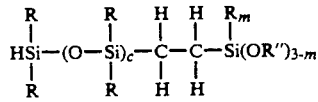   II where R, R", and m are as defined above, and c is 1 to 6. This endcapping composition can be produced by a method comprising (A) mixing 1 mole of a composition (a) of the formula

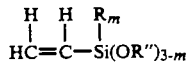

where R, R", and m are as defined above, with greater than 2 moles of a composition (b) of the formula

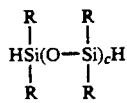

where R and c are as defined above, in the presence of a platinum catalyst and allowing to react, then, (B) optionally stripping the excess composition (b) from the product, to give an endcapping composition of the formula as given above. A preferred endcapping composition is that obtained when c is equal to 1 and m is equal to 0. The above endcapping composition, its method of manufacture, and its use in the manufacture of silicone sealants, having an alkoxy functional silane crosslinker and a titanium catalyst, is taught in U.S. Pat. No. 4,772,675, issued Sept. 20, 1988, which is hereby incorporated by reference to show the endcapping composition, its manufacture, and its use. The polymer produced from the above reaction of vinyl endblocked polydiorganosiloxane (I) and endcapping composition (II) can be represented by the formula

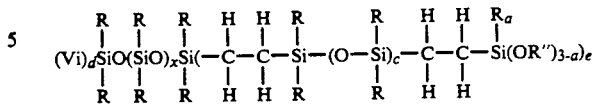

where each R, R", Vi, m, c, and x, are as defined above, and d and e are chosen so that d is on average less than 40 percent of the total of d plus e.

The amount of the endcapping composition (II) used to react with the vinyl endblocked polydiorganosiloxane (I) is chosen so that the desired number of the vinyl endblocking groups are replaced with the alkoxysilethylene endblocking group from (II) on a molar basis. As an example, when the endcapping composition (II) is of the formula

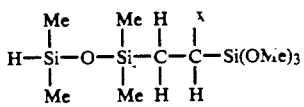

where Me is methyl radical and the vinyl endblocked polydiorganosiloxane (I) is a polydimethylsiloxane having a viscosity of about 55 Pa.s at 25° C. then the degree of endblocking versus the amount of endblocker used can be estimated from the following:

| Parts by Weight of Endblocker | Percent of Alkoxysilethylene Endblocks |
|---|---|
| 0.9 | 100 |
| 0.8 | 89 |
| 0.7 | 78 |
| 0.6 | 67 |
| 0.5 | 55 |

The above polymers can also be produced by using similar siloxanes and silanes in which the location of the hydrogen atom and the vinyl group which react together are reversed.

A dialkoxysilane (2) of the formula $R'_2Si(OR'')_2$ where each R' is selected from the group consisting of methyl and vinyl, and R" is as defined above, is added as a modulus control agent. These dialkoxysilanes and their method of manufacture are well known. The amount of dialkoxysilane preferably is from 0.1 to 14 parts by weight, with from 2 to 8 parts most preferred.

The sealants of this invention are cured through the use of a titanium catalyst (3). The titanium catalyst can be any of those known to be useful in catalyzing the moisture induced reaction of alkoxy containing siloxanes or silanes. Preferred is a titanium catalyst such as the beta-dicarbonyl titanium compounds such as those described in U.S. Pat. No. 3,334,067, the patent being herein incorporated by reference to show beta-dicarbonyl titanium compound. Preferred catalysts include bis-(acetylacetonyl)-diisopropyltitanate, and 2,5-di-isopropoxy-bis-ethylacetoacetate titanium. The amount of catalyst is from 0.2 to 6.0 parts by weight per 100 parts by weight of polymer (1). Preferred are from 0.5 to 3.0 parts by weight.

The filler used in the compositions of this invention is a precipitated calcium carbonate filler, having a fatty acid surface treatment and a surface area of greater than 20 m²/g. Precipitated calcium carbonate fillers are manmade materials formed through a "Milk of Lime" process which consists of exposing limestone to very high temperatures to form calcium oxide, then reacting with water and precipitating with carbon dioxide. The process typically gives particle sizes of from 3 to 0.07 micrometers in average diameter. The precipitated calcium carbonates tend to have a higher water content than ground calcium carbonate due to their smaller particle size and the process of manufacture. The precipitate is then treated with a fatty acid, such as stearic acid to improve its compatibility with the polymer in which it is to be used. These treated, precipitated calcium carbonates are commercially available. A preferred filler for this invention is Hakuenka-CCR, obtained from Shiraishi Kogyo Kaisha, Ltd., having a surface area of about 30 m/g and about 2.3 percent fatty acid treatment. Another preferred filler is Winnofil-SPM, obtained from ICI Resins US, having a surface area of about 23 m²/g and about 2.7 percent fatty acid treatment. The filler is preferred in amounts from 60 to 120 parts by weight per 100 parts by weight of polymer (1) with amounts from 70 to 90 most preferred. The optimum amount of filler will depend upon the polymer used and the filler used. The amount of filler used has an effect upon the physical properties of the cured sealant, particularly the tensile strength and elongation. As the amount of filler is increased the elongation is decreased. The silicone sealants claimed in this invention are required to have an elongation at break of greater than 800 percent, so the amount of filler is adjusted to give greater than this elongation. The preferred filler has greater than 22 m²/g surface area.

It has also been found that when amounts of the above treated fillers of 70 and 80 parts per 100 parts of polymer are used, up to 50 percent by weight of the filler can be replaced by a surface treated ground calcium carbonate having an average particle size of about 3 micrometers.

The process of this invention requires that the polymer mixture (1), the dialkoxysilane (2), and the titanium catalyst (3) be mixed together before the addition of the precipitated calcium carbonate filler (4). The dialkoxysilane (2) must be added to the polymer mixture (1) before or at the same time as the titanium catalyst (3), and they must be mixed together before the filler (4) is added. Since the polymer mixture (1) and the dialkoxysilane (2) will react with each other, particularly in the presence of the titanium catalyst (3) in the presence of moisture, it is necessary that moisture not be present in these ingredients and that the mixing be carried on without allowing the ingredients to come into contact with moisture from the atmosphere. A preferred procedure adds the polymer mixture to a mixing device which can be subjected to vacuum, then mixes in the dialkoxysilane until uniform. The catalyst is then added and mixed until uniform. At this point in the process it is preferred to draw a vacuum on the mixture while continuing mixing in order to remove residual volatile materials, including any water which may have been introduced and alcohol which is generated. The precipitated calcium carbonate filler is then added and mixed until uniform. A vacuum is again applied to the mixture to remove any volatile materials, including any moisture added with the filler, and to remove air from the mixture. The desired mixture is then transferred to storage tubes, without exposure to moisture in the air. If the process is changed so that the filler is added before the catalyst and chain extender, the finished sealant is a different product. Sealants made not following the order of mixing of this invention have poorer adhesion to substrates than sealants which are processed according to the process of this invention.

The following examples are included for illustrative purposes only and should not be construed as limiting the invention which is properly set forth in the appended claims. All parts are parts by weight.

Alkoxysilethylene Endblocked Polydiorganosiloxane

The polymer mixtures used in this invention were produced by placing 100 parts by weight of dimethylvinylsiloxy endblocked polydimethylsiloxane having a viscosity of about 55 Pa.s at 25° C. in a mixing vessel and adding 0.01 part of chloroplatinic acid complex of divinyltetramethyldisiloxane, which had been diluted with dimethylvinylsiloxy endblocked polydimethylsiloxane to provide 0.7 weight percent platinum in the complex, and stirring for 10 minutes. Then 1.1 parts (polymer A) or 0.7 part (polymer B) of a tetramethyldisiloxane having a trimethoxysilylethylene group on one end with the formula

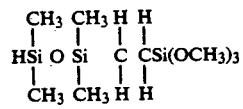

was slowly added and agitation was continued for 3 to 4 hours, maintaining the temperature below 50° C. at all times. Polymer A, with 1.1 parts of endcapper per 100 parts of polymer would have essentially all of the endgroups blocked with the trialkoxysilethylene group. Polymer B, with 0.7 part of endcapper per 100 parts of polymer would have approximately 80 percent of the endblocks as trimethoxysilethylene groups and 20 percent as vinyl groups.

EXAMPLE 1

A series of sealants were prepared by mixing 100 parts of polymer A with 7 parts of vinylmethyldimethoxysilane and 2 parts of 2,5-di-isopropoxy-bis-ethylacetoacetate titanium in the absence of moisture until uniform, then a vacuum of about 20 to 25 inches of mercury was applied and mixing continued for about 4 minutes to remove air and volatiles. Then the amounts of precipitated calcium carbonate shown in Table I were added and mixed in without exposing the mixture to moisture. The mixture was then put under vacuum of 20 to 25 inches of mercury and mixing continued for 10 to 15 minutes until the mixture was smooth and air free. The sealant was then transferred to a sealed storage tube without exposure to moisture.

Test samples were prepared by extruding the sealant from the storage tube into a chase and smoothing the sealant into a slab, 0.080 inches in thickness. After curing for 7 days at 50 percent relative humidity and 25° C., test pieces were cut out and tested, durometer in accordance with ASTM D 2240, tensile strength and elongation in accordance with ASTM D 412. The rate of curing of the samples was determined by a tack free time (TFT). The tack free time is defined as the time in minutes required for a curing material to form a nontacky surface film. A sample is spread on a clean smooth surface and timing is begun. Periodically, a clean strip of polyethylene film is laid upon a fresh surface and a one ounce weight applied to it. After 4 seconds, the weight is removed and the strip gently pulled off. The time when the strip pulls cleanly away from the sample is recorded as the tack free time.

TABLE I

| Filler | Parts | Durometer Shore A | Tensile Strength psi | Elongation percent | TFT min. |
|---|---|---|---|---|---|
| Hakuenka-CCR | 70 | 8 | 30 | 1054 | 102 |
| Hakuenka-CCR* | 85 | 9 | 23 | 499 | 97 |
| Hakuenka-CCR* | 100 | 8 | 18 | 331 | 120 |
| Winnofil-SPM | 85 | 12 | 36 | 1243 | 98 |
| " | 100 | 12 | 34 | 823 | 90 |

*comparative example

A series of comparative sealants were made in which the vinylmethyldimethoxysilane was replaced with methyltrimethoxysilane, and the polymer B having 20 percent polymer ends which would not be reactive in the curing was substituted for the polymer A having all reactive ends. The results obtained are shown in Table II.

TABLE II*

| Filler | Parts | Durometer Shore A | Tensile Strength psi | Elongation percent | TFT min. |
|---|---|---|---|---|---|
| Hakuenka-CCR | 70 | 30 | 196 | 321 | 65 |
| " | 85 | 34 | 250 | 389 | 37 |
| " | 100 | 36 | 280 | 434 | 33 |
| Winnofil-SPM | 85 | 38 | 324 | 340 | 52 |
| " | 100 | 42 | 344 | 328 | 45 |

*comparative example

The methyltrimethoxysilane does not yield a sealant having the required percent of elongation for the intended use, even though a polymer having less trimethoxysilethylene ends was used.

The adhesion of a formulation of this invention was tested by using the first composition of Table I to make 3 tensile adhesion joints. These joints were made by laying 1 by 1 by 3 inch concrete blocks, which had been cleaned with water and dried to remove all dust and loose debris, together with their 3 inch sides parallel and ½ inch apart to give a ½ by ½ by 3 inch long space. A ½ inch diameter polyethylene backer rod was inserted into the bottom of the space, then a bead of the test sealant used to fill the remainder of the space, with the upper surface of the sealant being flat and even with the upper surface of the concrete blocks. The joints were cured for 21 days at standard laboratory conditions, then submerged in water for 7 days. The joints were then flexed to a 45 degree angle and the amount of release of the sealant from the concrete surfaces observed. The average amount of release was about 0.75 cm2 out of the total surface area of 32.8 cm2. The joints were then placed in a testing machine which compressed the joint 50 percent, then elongated the joint for 100 percent, at a rate of ¼ inch per hour. After a total of ten such cycles, the joint was flexed 45 degrees and an average release of about 1 cm2 was observed. The material adhered well to concrete.

EXAMPLE 2

A series of samples were prepared as in Example 1, using polymer B, 70 parts of Winnofil-SPM filler, 2 parts of 2,5-di-isopropoxy-bis-ethylacetoacetate titanium catalyst, and the kind and amount of silane crosslinker or chain extender shown in Table III.

TABLE III

| Silane | Parts | Durometer Shore A | Tensile Strength psi | Elongation percent | TFT min. |
|---|---|---|---|---|---|
| DMDM | 7 | 6 | 79 | 895 | 173 |
| " | 7 | 6 | 74 | 919 | 156 |
| " | 7 | 6 | 62 | 932 | 163 |
| MTM* | 7 | 33 | 266 | 281 | 49 |
| PhTM* | 10 | 26 | 215 | 525 | 36 hr. |
| VMDM* | 7 | uncured | | | 203 |
| PhMDM* | 10 | uncured | | | 52 hr. |

DMDM = dimethyldimethoxysilane
MTM = methyltrimethoxysilane
PhTM = phenyltrimethoxysilane
VMDM = vinylmethyldimethoxysilane
PhMDM = phenylmethyldimethoxysilane
*comparative examples Another series was prepared in the same manner, but using 1.6 parts of tetrabutyltitanate as catalyst instead of the 2 parts of 2,5-di-isopropoxy-bis-ethylacetoacetate titanium used above. The results obtained are shown in Table IV.

TABLE IV

| Silane | Parts | Durometer Shore A | Tensile Strength psi | Elongation percent | TFT min. |
|---|---|---|---|---|---|
| MTM* | 7 | 32 | 315 | 378 | 199 |
| PhTM* | 10 | 22 | 222 | 630 | 50 hr. |
| VMDM | 7 | 5 | 45 | 919 | 405 |
| PhMDM* | 10 | 0 | 16 | 10 | 55 hr. |

*comparative results

These results show that only the vinylmethyldimethoxysilane in combination with the tetrabutyltitanate catalyst gave the required elongation. This formulation had a longer TFT time with polymer B as compared to use of Polymer A in the second set of samples in Example 3, below.

EXAMPLE 3

A series of samples were prepared as in Example 2, using polymer A, 70 parts of Winnofil-SPM filler, first the 2,5-di-isopropoxy-bis-ethylacetoacetate titanium catalyst and then the tetrabutyltitanate catalyst, and the kind and amount of silane crosslinker or chain extender shown in Table V.

TABLE V

| Silane | Parts | Durometer Shore A | Tensile Strength psi | Elongation percent | TFT min. |
|---|---|---|---|---|---|
| 2,5-di-isopropoxy-bis-ethylacetoacetate titanium catalyst | | | | | |
| MTM* | 7 | 47 | 300 | 217 | 34 |
| PhTM* | 10 | 45 | 247 | 257 | 24 hr. |
| VMDM | 7 | 14 | 80 | 1604 | 148 |
| PhMDM* | 10 | 5 | 30 | 1467 | 24 hr. |
| Tetrabutyltitanate catalyst | | | | | |
| MTM* | 7 | 46 | 321 | 252 | 145 |
| PhTM* | 10 | 9 | 83 | 1706 | 27 hr. |
| VMDM | 7 | 18 | 208 | 988 | 215 |
| PhMDM* | 10 | 9 | 76 | 1639 | 27 hr. |

*comparative example

These results show that only the vinylmethyldimethoxysilane in combination with the 2,5-di-isopropoxy-bis-ethylacetoacetate titanium result in the desired high elongation coupled with a short cure timel; a combination of properties making the sealant esspecially useful in the highway sealant market.

EXAMPLE 4

A series of comparative sealants was prepared, but the order of mixing was changed. First, 100 parts of Polymer A and the parts of Winnofil-SPM filler shown below in Table VI were mixed together. Then 2 parts of 2,5-di-isopropoxy-bis-ethylacetoacetate titanium catalyst and 7 parts of vinylmethyldimethoxysilane were added, all done without exposure to moisture and with the deairing steps of Example 1 included. The sealants were tested as in Example 1 with the results shown in Table VI.

TABLE VI*

| Filler | Parts | Durometer Shore A | Tensile Strength psi | Elongation percent | TFT min. |
|---|---|---|---|---|---|
| Winnofil-SPM | 70 | 2 | 16 | 17 | 143 |
| " | 80 | 2 | 14 | 5 | 105 |
| " | 90 | 2 | 16 | 13 | 103 |
| " | 100 | 4 | 21 | 22 | 87 |

*comparative examples

These results show that the method of this invention must be followed in order to obtain successful results, even though the ingredients used in this example are those required in the method of this invention, the change in method gave sealants with unsatisfactory properties.

That which is claimed is:

1. A process of producing silicone sealants containing polydiorganosiloxane having alkoxy endblocking, alkoxy functional chain extender, and titanium catalyst, wherein the improvement comprises a method consisting essentially of (A) first mixing in the absence of moisture (1) 100 parts by weight of a polymer mixture of the average formula

where each R is free of aliphatic unsaturation and is selected from the group consisting of monovalent hydrocarbon, monovalent halohydrocarbon, and monovalent cyanoalkyl radicals of 1 to 18 inclusive carbon atoms, each D is selected from the group consisting of vinyl radical and radicals of the formula

where each R" is selected from the group consisting of methyl, ethyl, propyl, and butyl, Z is a divalent hydrocarbon radical or a combination of divalent hydrocarbon radicals and siloxane radicals, m is 0 or 1, and x is of a value such that the polymer has a viscosity of from 0.5 to 3000 Pa.s at 25° C., less than 40 percent of the total of the endblocking radicals D in the polymer mixture being vinyl radicals, (2) from 0.1 to 14 parts by weight of a dialkoxysilane of the formula

where each R' is selected from the group consisting of methyl and vinyl, R" is as defined above, and (3) from 0.2 to 6.0 parts by weight of titanium catalyst, and then (B) adding after the above are mixed, (4) from 10 to 200 parts by weight of precipitated calcium carbonate filler, having a fatty acid surface treatment and a surface area of greater than 20 m²/g, then (C) storing the mixture in the absence of moisture, to give a sealant which is stable in the absence of moisture, has an elongation at break of greater than 800, and has adhesion to concrete.

2. The method of claim 1 in which R is a methyl radical.

3. The method of claim 2 in which R" is a methyl radical.

4. The method of claim 3 in which R' is a methyl radical.

5. The method of claim 1 in which the dialkoxysilane (2) is from 2 to 8 parts of dimethyldimethoxysilane.

6. The method of claim 1 in which the dialkoxysilane (2) is from 2 to 8 parts of vinylmethyldimethoxysilane.

7. The method of claim 5 in which the titanium catalyst (3) is tetrabutyltitanate.

8. The method of claim 5 in which the titanium catalyst (3) is 2,5-di-isopropoxy-bis-ethylacetoacetate titanium.

9. The method of claim 6 in which the titanium catalyst (3) is tetrabutyltitanate.

10. The method of claim 6 in which the titanium catalyst (3) is 2,5-di-isopropoxy-bis-ethylacetoacetate titanium.

11. The method of claim 1 in which the precipitated calcium carbonate filler has a fatty acid surface treatment and has a surface area of greater than 22 m²/g.

12. The method of claim 7 in which the precipitated calcium carbonate filler has a fatty acid surface treatment and has a surface area of greater than 22 m²/g.

13. The method of claim 8 in which the precipitated calcium carbonate filler has a fatty acid surface treatment and has a surface area of greater than 22 m²/g.

14. The silicone sealant produced by the method of claim 1.

15. The silicone sealant produced by the method of claim 12.

16. The silicone sealant produced by the method of claim 13.